(12) United States Patent
Waltl

(10) Patent No.: US 12,429,851 B2
(45) Date of Patent: Sep. 30, 2025

(54) CLOUD COMPUTING SYSTEM, METHOD AND COMPUTER PROGRAM

(71) Applicant: Software Defined Automation GmbH, Garching bei Muenchen (DE)

(72) Inventor: Josef Waltl, Munich (DE)

(73) Assignee: SOFTWARE DEFINED AUTOMATION GMBH, Garching bei Muenchen (DE)

( * ) Notice: Subject to any disclaimer, the term of this patent is extended or adjusted under 35 U.S.C. 154(b) by 0 days.

(21) Appl. No.: 18/693,960

(22) PCT Filed: Apr. 12, 2022

(86) PCT No.: PCT/EP2022/059787
§ 371 (c)(1),
(2) Date: Mar. 21, 2024

(87) PCT Pub. No.: WO2023/198280
PCT Pub. Date: Oct. 19, 2023

(65) Prior Publication Data
US 2024/0385592 A1    Nov. 21, 2024

(51) Int. Cl.
*G06F 9/02*     (2006.01)
*G05B 19/4155*  (2006.01)
(Continued)

(52) U.S. Cl.
CPC ............. *G05B 19/4155* (2013.01); *G05B 2219/31449* (2013.01)

(58) Field of Classification Search
CPC ...... G05B 19/4155; G05B 2219/31449; G05B 19/4063; G05B 19/41875; G05B 11/36;
(Continued)

(56) References Cited

U.S. PATENT DOCUMENTS

| 7,853,941 | B1 | 12/2010 | Niggemann et al. |
| 8,301,746 | B2 * | 10/2012 | Head ............... G06F 9/5077 718/1 |

(Continued)

FOREIGN PATENT DOCUMENTS

| CN | 113661455 A | 11/2021 |
| DE | 102004012315 A1 | 10/2005 |

(Continued)

OTHER PUBLICATIONS

Badar, Amjad et al.; "Intelligent Edge Control with Deterministic-IP based Industrial Communication in Process Automation"; *2019 15th International Conference on Network and Service Management (CNSM)*; Oct. 21, 2019; pp. 1-7; XP033725812; IEEE; Piscataway, NJ, USA.

(Continued)

*Primary Examiner* — Thuy Dao
(74) *Attorney, Agent, or Firm* — LEYDIG, VOIT & MAYER, LTD.

(57) ABSTRACT

A method for configuring a controller of an industrial automation system via a network includes obtaining, by a cloud computing system, a controller configuration and a controller program. The cloud computing system generates, based on the obtained controller configuration and the obtained controller program, a compile time representation of the controller allowing modification of the controller program and the controller configuration. The cloud computing system also generates a modified controller program and a modified controller configuration, using the compile time representation of the controller, wherein the controller program defines runtime operation of the controller controlling a subsystem of the industrial automation system. The cloud computing system provides, via the network, the modified controller program and the modified controller (Continued)

configuration to the controller of the industrial automation system.

15 Claims, 4 Drawing Sheets

(51) Int. Cl.
    *G06F 9/445* (2018.01)
    *G06F 9/455* (2018.01)
    *G06F 9/50* (2006.01)
    *G06F 15/173* (2006.01)
    *H04L 9/40* (2022.01)

(58) Field of Classification Search
    CPC . G05B 13/042; G05B 19/056; G06F 16/2471;
        G06F 16/24578; G06F 16/90324; G06F
        16/256; G06F 8/656; G06F 9/547; G06F
        9/542
    See application file for complete search history.

(56) References Cited

U.S. PATENT DOCUMENTS

| 12,169,742 | B2* | 12/2024 | Barletta | G06F 9/547 |
|---|---|---|---|---|
| 12,216,460 | B2 | 2/2025 | Lutz | |
| 2014/0336791 | A1 | 11/2014 | Asenjo et al. | |
| 2015/0120012 | A1 | 4/2015 | Dickie | |
| 2016/0112283 | A1 | 4/2016 | Maturana et al. | |
| 2017/0343967 | A1 | 11/2017 | Verma | |
| 2017/0351226 | A1 | 12/2017 | Bliss et al. | |
| 2019/0130057 | A1 | 5/2019 | Asenjo et al. | |
| 2020/0103842 | A1 | 4/2020 | Kobayashi | |
| 2021/0080941 | A1 | 3/2021 | Entzminger et al. | |
| 2021/0356944 | A1 | 11/2021 | Chauvet et al. | |
| 2021/0389968 | A1 | 12/2021 | Majewski et al. | |
| 2022/0100182 | A1 | 3/2022 | Mehrotra et al. | |

FOREIGN PATENT DOCUMENTS

| EP | 3734379 A1 | 11/2020 |
|---|---|---|
| JP | 2020/086638 A | 6/2020 |

OTHER PUBLICATIONS

Givehchi, Omid et al.; "Control-as-a-Service from the Cloud: A Case Study for using Virtualized PLCs"; *10th IEEE Workshop on Factory Communication Systems*; Jun. 19, 2014; pp. 1-4; IEEE; Piscataway, NJ, USA.

\* cited by examiner

CLOUD COMPUTING SYSTEM, METHOD AND COMPUTER PROGRAM

CROSS REFERENCE TO RELATED APPLICATIONS

This application is a U.S. National Phase application under 35 U.S.C. § 371 of International Application No. PCT/EP2022/059787, filed on Apr. 12, 2022. The International Application was published in English on Oct. 19, 2023 as WO 2023/198280 A1 under PCT Article 21(2).

FIELD

The present disclosure relates to a cloud computing system, as well as to a related method and computer program for configuring and optimizing performance of industrial automation systems.

BACKGROUND

Since the invention of Programmable Logic Controllers (PLCs) in the late 1960s, large scale automated production of goods has increased wealth and productivity of industrialized economies. Overall GDP impact of Industrial Manufacturing is 14% in the G10 states, and the energy consumption is around 30% of industrialized nations energy. Over the last decades, industrial automation equipment providers have mainly developed proprietary technology—from the field bus and input/output (I/O) device, PLC level to enterprise industrial software systems. While such vertical system integration guarantees within-stack compatibility, it leads to strong dependencies and decreases interoperability across different automation technology platforms, security issues and high costs. Furthermore, in such platforms industrial control code editing systems and the control code instruction dialects (typically some variations of a 1990s standardizing attempt such as IEC 61131/3) are also kept proprietary resulting in a tight coupling of software and hardware in PLC runtime systems. Typically, PLC code editing systems are kept to local windows applications and PLC programming must be carried out mostly in physical proximity to the actual PLC device. Changing the behavior of industrial production lines is thus mainly a manual task done on individual PCs while physically connected to a PLC located in a cabinet of a production machine.

Further, conventional system architecture of such hardware-centric industrial automation technology platforms does not allow for integration of production lines into modern company software systems, typically comprising micro service-based systems implementing core company functions such as product lifecycle management (PLM) supply chain management (SCM), customer relationship management (CRM), enterprise resource planning (ERP), etc. While such corporate core function software systems already employ cloud-based services, changes in the core function of manufacturing, e.g., via PLC re-programming/re-configuration, still often requires sending an e-mail to the automation engineering department describing the changes of an industrial production system requires modification.

Moreover, the tight coupling of hardware and software in common industrial controllers has grown a plethora of vendor specific hardware architectures and results in the use of application-specific integrated circuits (ASIC) leading to long lead times for industrial automation equipment and vulnerability to supply chain disruption. Further, the current answer to deterministic run time is using software and hardware integrated in a single PLC which results in highest cost of compute, also in terms of maintenance and availability.

Thus, further improvements in industrial automation technology are needed.

In this context, US 2021/0356944 A1 relates to system and methods for providing centralized management of a software defined automation (SDA) system. The described SDA system comprises a collection of controller nodes and logically centralized and yet physically distributed collection of compute nodes.

Further, O. Givehchi, J. Imtiaz, H. Trsek and J. Jasperneite, "Control-as-a-service from the cloud: A case study for using virtualized PLCs," 10th IEEE Workshop on Factory Communication Systems, 2014 relates to the concept of implementing a PLC as a service within a cloud-based infrastructure and discusses performance of such cloud-based PLCs with respect to legacy PLCs.

SUMMARY

In an embodiment, the present disclosure provides a method for configuring a controller of an industrial automation system via a network. The method includes obtaining, by a cloud computing system, a controller configuration and a controller program. The cloud computing system generates, based on the obtained controller configuration and the obtained controller program, a compile time representation of the controller allowing modification of the controller program and the controller configuration. The cloud computing system also generates a modified controller program and a modified controller configuration, using the compile time representation of the controller, wherein the controller program defines runtime operation of the controller controlling a subsystem of the industrial automation system. The cloud computing system provides, via the network, the modified controller program and the modified controller configuration to the controller of the industrial automation system

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
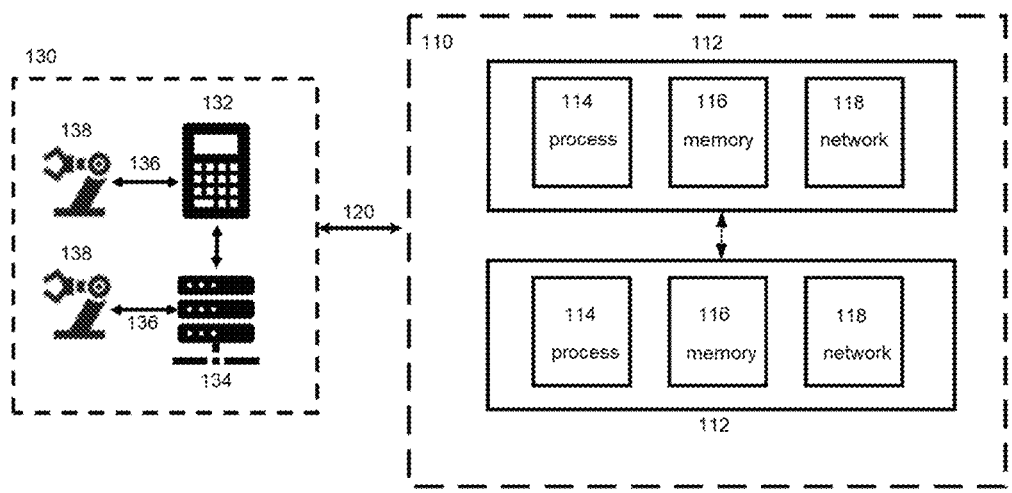
FIG. 1: a functional-block diagram of a cloud computing system for configuring industrial controllers according to some aspects of the present disclosure.

In an embodiment, the present disclosure provides a method for configuring a controller of an industrial automation system, comprising, obtaining, by a cloud computing system, a controller configuration and a controller program. The method further comprises generating, by the cloud computing system, based on the obtained controller configuration and the obtained controller program, a compile time representation of the controller allowing modification of the controller program and the controller configuration and generating, by the cloud computing system, a modified controller program and/or a modified controller configuration, using the compile time representation of the controller, wherein the controller program defines runtime operation of the controller controlling a subsystem of the industrial automation system. The modified controller program and/or the modified controller configuration is then provided, by the cloud computing system via a network to the controller being configured.

For instance, parts of the controller configuration and/or the controller program may be obtained, at the cloud computing system, from the controller via the network, from a controller configuration file and/or from a software library or source code repository residing within or outside the cloud computing system.

For instance, PLC project files generated via vendor-specific software such as Siemens TIA Portal, Rockwell Studio 5000, Codesys Engineering etc. may be imported and used for importing parts of the controller configuration and/or the controller program.

Alternatively or additionally, the controller program may also be obtained, at the cloud computing system, from an integrated development environment (IDE) service hosted by the cloud computing system or connected to it via a network. Further, the controller configuration may comprise one or more of: controller type and capability information, network configuration of the controller, interface information for electromechanical drives; interface configuration for I/O devices connected to the controller via back panel integration of Industrial Field Bus Systems.

One improvement provided by the present disclosure is that said compile time representation of the industrial automation controller (also designated synonymously as PLCTwin service in the following) can exist in the same IT/cloud infrastructure as other company core microservices and software systems.

Herein the term compile time is to be understood to cover the time at or prior to the generation of run time machine code from a corresponding source code as well as the time during which the source code is generated, e.g., the time needed for extracting the source code from a configuration file or the time needed to write the source code via a high-level programming language or system such as a cloud-based IDE.

For instance, the PLC Twin service allows modification (e.g., via an IDE connected to a GUI or an API) of an existing/obtained controller program—at compile time—while or before a corresponding executable is currently running—at run time—on one or more industrial controllers (e.g., PLCs, virtual PLCs etc.) of an industrial automations system.

Aspects of the present disclosure thus allow to optimize the run time of automation systems with regards to response time and cost of compute. Execution of real time sensitive automation control tasks can still be performed in close proximity to the industrial assets under control while the PLC Twin service abstracts major PLC functions across different technology platforms. Based on a secure and non-intrusive connectivity service the PLC Twin service fully abstracts the PLC control logic and allows system wide automatic PLC deployment within minutes.

Discussed in more detail below, aspects of the present disclosure thus enable a micro services enterprise architecture above real-time control level to natively interact with industrial automation—in essence industrial automation is turning into a set of micro services in the company core stack. Further, aspects of the present disclosure allow building of programmatic APIs on top of control instructions as a key enabler to full loop system optimization.

Further, aspects of the present disclosure also enable, modern CI/CD dev-ops features such as IDE as a service (IDEaaS), PLC Code versioning, configurable access and security policies, monitoring of code integrity across whole PLC fleet services etc.

As discussed in further detail below, the modified controller program can then be provided to a compiler service (operably connected to or integrated with the PLC Twin service) hosted by the cloud computing system, generating a run time executable which is then provided, via a network, to one or more hardware-based PLC or virtual PLC service, hosted by an edge-computing system, controlling a subsystem of an industrial automation system. Such a compilation service may be a cloud computing service external to the PLC Twin service or integrated into it.

For instance, the compiler service and/or the PLC Twin service may be implemented in a configurable virtualization environment such as a container or micro service specifying security access policies and/or system resource utilization parameters as well as comprising software libraries required for isolated execution by different types of (virtual) cloud computing equipment.

Once the controller program and configuration parameters are represented via such a PLC Twin service, programming interfaces such as Application Programming Interfaces (APIs) can be used to programmatically adapt controller code and/or configuration parameters via other company software systems like PLM, SCM, CRM, ERP, Analytics, AI and/or via a graphical user interface displayed on a terminal device and connected to the cloud computing system via a network. In this manner, the PLC Twin service forms the basis for cloud-based automation of automation engineering.

Thus, some aspects may further comprise receiving, at the cloud computing system, via a programming interface (e.g., an API), programming and configuration instructions for modifying the controller program and/or the controller configuration and generating, using the compile time representation the modified controller program and/or modified controller configuration based on the received instructions.

For instance, said programming and configuration instructions might be received via an API from a second cloud computing system, wherein the programming and configuration instructions may be configured for modifying the controller program and/or the controller configuration based on product lifecycle management, PLM, requirements, manufacturing execution requirements, customer relationship management, CRM, requirements, supply chain management, SCM, requirements and/or enterprise resource planning, ERP, requirements.

In some implementations, the obtained controller program and/or the programming and configuration instructions may also be generated using an IDE service, preferably containerized, and hosted by the cloud computing system.

Thus, some aspects of the present disclosure enable integration of industrial automation system setup and reconfiguration into existing cloud-based company software systems resulting in less downtime, cost and increased production output.

Further, in some implementations, the compile time representation of the controller may comprise or use a persistence layer holding controller configurations and control instruction elements of the controller program, wherein the individual elements are represented as separated control logic objects.

In some implementations, the individual elements of the persistence layer may be individually configurable based on programming and configuration instructions received via the programming interface.

Essentially, the persistence layer can act as a single source of truth (e.g., via a cloud-based data storage module providing code versioning capabilities) for all control code used by the controllers (e.g., PLCs, virtual PLCs etc.) of an industrial automation system, which allows for a multitude of benefits. For instance, a key security benefit is the full backup capability of complete production lines or even complete factories in case of a security incidence (e.g., a STUXnet-type incident) e.g., in the control layer. Using such a persistence layer or similar persistence functions further improves debugging and system maintenance via system-wide and technology-agnostic code versioning capabilities.

Some aspects may further comprise receiving, at the cloud computing system, via the network, sensor data associated with a subsystem of the industrial automation system, controlled by the controller and generating, by the cloud computing system, programming and configuration instructions for modifying the controller program and/or the controller configuration, based on analyzing the received sensor data.

In this manner, the present disclosure enables full closed loop reconfiguration of industrial automation systems in a technology and vendor agnostic manner and thereby provides the technical foundation for self-optimizing production systems.

While such closed loop reconfiguration of industrial automation systems works most efficiently and securely by using a compile time representation of the involved controllers, as discussed above, other implementations are conceivable and covered by the present disclosure. Thus, the present disclosure also provides a method for reconfiguring a controller of an industrial automation system, comprising: receiving, at the cloud computing system, via a network, sensor data associated with a subsystem of the industrial automation system, controlled by the controller, generating, by the cloud computing system, a modified controller program and a modified controller configuration, based on analyzing the received sensor data and providing, by the cloud computing system via a network, the modified controller program and the modified controller configuration to the controller of the industrial automation system, wherein the controller program defines run time operation of the controller.

Some implementations may further comprise deriving, by the cloud computing system and based on the received sensor data, a quality metric associated with operation of the subsystem controlled by the controller, comparing, by the cloud computing system, the quality metric with an operation requirement for the industrial automation system (e.g., overall system output requirements, frequency of product defect, etc.) and generating, by the cloud computing system, the programming and configuration instructions based on the comparison of the quality metric with the operation requirement.

For instance, the cloud computing system may employ cloud computing software such as a trained neural network for assessing/classifying product quality based on received image sensor data and compare a frequency or percentage of products manufactured with low quality with an operation requirement received from other company software systems (e.g., product defect shall be lower than 5 percent). Based on this comparison, the cloud computing system may generate programming and configuration instructions and provide them to the compile time representation of one or more controllers for changing the run time behavior of the controllers to decrease product defect.

For instance, the cloud computing software may also be configured for determining a likely cause and/or suitable controller program modification for matching the operation requirement based on the received sensor data.

In some implementations, the controller may be a virtual controller implemented by edge computing software executed by an edge computing system operably connected to the cloud computing system and the industrial automation system. In such implementations, the controller configuration may specify a virtualization environment for executing the edge computing software implementing the virtual controller and may comprises a network configuration of a physical I/O device connected to a subsystem of the industrial automation system to be controlled by the virtual controller.

In some implementations, the virtual controller may be instantiated, by the cloud computing system via the network on a host machine of the edge computing system managed by a real-time hypervisor using the compile time representation of the virtual controller.

To improve security, scalability and enhance edge computing resource efficiency, the code implementing such virtual PLCs can also be containerized as discussed above for the PLC Twin service and/or the compiler service.

Thus, aspects of the present disclosure allow for (re-)configuration of complex industrial control systems employing a combination of hardware-based and virtual controllers from a uniform cloud-based interface that treats different types, models and implementations if industrial control equipment on an equal footing. In this manner, the key advantages of cloud computing, edge computing and hardware-based PLCs can be synergistically integrated into a single hybrid industrial automation control system with greatly improved security, scalability and flexibility while maintaining real-time and deterministic behavior where needed. As discussed above such an integrated hybrid industrial automation control system can easily be interfaced with other core company software systems resulting in significant gains in productivity, product customization capabilities and reduction in manufacturing facility downtime.

Some implementations may further comprise receiving, at the cloud computing system, monitoring data from the edge computing system characterizing performance of the virtual controller. Similar to sensor data received by the cloud computing system, such monitoring data may be used for optimizing performance of the industrial automation system as discussed above.

In further aspect, the present disclosure also provide a cloud computing system for configuring controllers of an industrial automation system, the cloud computing system comprising one or more cloud compute nodes, each providing processing, memory and networking resources for execution of cloud computing software wherein the cloud compute nodes are configured to receive and to transmit, via a network, data from and to the controllers and, optionally, from one or more sensors monitoring the industrial automation system wherein the one or more cloud compute nodes are configured to execute cloud computing software to configure the controllers, via the network, by performing one of the methods as discussed above and in the following.

In further aspect, the present disclosure also provides a computer program, comprising instructions for carrying out the one of the methods as discussed above and in the following, when being executed by such a cloud computing system.

As discussed above, the present disclosure thus also provides for a distributed industrial automation control system comprising a first cloud computing system as described above, one or more controllers connected to the cloud computing system via a network and a second cloud computing system communicating with the first cloud computing system via an API.

In a further aspect, the present disclosure provides for a method for optimizing performance of an industrial automation system, comprising generating, by a cloud computing system (e.g., by using a PLC Twin service as discussed above), a modified controller program and/or a modified controller configuration for a controller controlling a subsystem of the industrial automation system, wherein the controller program defines runtime operation of the controller. The method further comprises providing, by the cloud computing system via a network, the modified controller program and/or the modified controller configuration to the controller to modify the run time operation of the controller, receiving, at the cloud computing system via the network, sensor data for the industrial automation system, estimating, by the cloud computing system and based on the received sensor data, a change of performance of the industrial automation system caused by the modified run time operation of the controller and optimizing, by the cloud computing system, the performance of the industrial automation system based on the estimated change of performance.

In some implementations, optimizing the performance of the industrial automation system may comprise one or more of: storing, in a memory subsystem, a data structure correlating the modification of the controller program and/or the controller configuration with the estimated change in performance, deriving, based on the estimated change in performance, a subsequent modification of the controller program and/or the controller configuration and comparing the estimated change of performance with a prediction derived from a computational model of the industrial automation system.

For instance, by storing such a data structure correlating the modification of the controller program and/or the controller configuration with the estimated change in performance a training set of labeled samples may be generated, preferably across many different industrial automation systems that may be used as input for modern machine learning paradigms such as reinforcement learning.

For instance, deriving the subsequent modification of the controller program and/or the controller configuration may be based on a stochastic search algorithm or reinforcement learning.

Some implementations may comprise training a deep reinforcement learning neural network model based at least in part on a training set comprising stored correlations of controller program and/or the controller configuration modifications with the estimated changes in performance, wherein, optionally, the training set is obtained from multiple different industrial automation systems.

In this manner, the present disclosure provides for autonomous AI-based optimization of complex industrial automation systems that may comprise a plurality of different controller technologies, types and models.

In the following, some exemplary embodiments of the present disclosure described in more detail, with reference to exemplary processes and computing systems. Naturally, the computing systems provided by the present disclosure may employ standard hardware components (e.g., cloud compute nodes or servers connect to each other via conventional wired or wireless networking technology). In some implementations, application-specific hardware (e.g., circuitry for training neural network models and/or circuitry for executing trained models, etc.) may also be employed. Further, such computing systems are configured to execute software instructions (e.g., retrieved from collocated or remote non-transitory memory circuitry) to execute the computer-implemented methods discussed herein.

While specific feature combinations are described in the following paragraphs with respect to exemplary embodiments of the present disclosure, it is to be understood that not all features of the discussed embodiments have to be present for realizing the disclosure, which is defined by the subject matter of the claims. The disclosed embodiments may be modified by combining certain features of one example embodiment with one or more technically and functionally compatible features of other exemplary embodiments. Specifically, the skilled person will understand that features, components, processing steps and/or functional elements of one exemplary embodiment can be combined with technically compatible features, processing steps, components and/or functional elements of any other exemplary embodiment of the present disclosure as long as covered by the specifications of provided by the appended claims.

Moreover, the various embodiments discussed herein can be implemented in hardware, software or a combination thereof: For instance, the various components, elements, subsystems, modules, etc. of the systems disclosed herein may also be implemented via application specific software being executed on multi-purpose data and signal processing equipment such as servers, compute nodes, CPUs, DSPs and/or systems on a chip, SOCs, or similar components or any combination thereof: Some implementations also employ application specific hardware components such as application specific integrated circuits, ASICs, and/or field programmable gate arrays, FPGAs, and/or similar components and/or any combination thereof.

For instance, the various computing (sub)-systems discussed herein may be implemented, at least in part, on multi-purpose data processing equipment such as cloud and/or edge computing servers.

FIG. 1 shows a functional block diagram illustrating system architecture, functions and operation of a cloud computing system 110 according to an aspect of the present disclosure. As discussed above, the cloud computing system 110 may comprise one or more cloud compute nodes 112, each providing (e.g., virtualized) processing resources 114, memory resources 116 and networking resources 118 for cloud-based distributed execution of cloud computing software.

The cloud compute nodes 112 are configured to receive and to transmit, via a network 120 (e.g., an IP-based network such as the internet), data from and to controllers 132 of an industrial automation system 130 and, optionally, from and to one or more sensors monitoring operation of the industrial automation system 130. The industrial automation system 130 may also comprise (or may be connected to) edge computing equipment 134 (e.g., one or more edge computing nodes executing edge computing software) that may be configured for hosting virtualized and preferably containerized virtual industrial controllers as discussed above. The industrial automation system 130 may also comprise hardware-based industrial controllers 132 such as PLCs.

The virtual and hardware-based controllers of the industrial automation system 130 may be connected via real-time capable industrial automation networking technology 136 to actuators 138 and sensors of the industrial automation system 130. As also discussed above, the cloud compute nodes 112 are configured to execute cloud computing software to configure the controllers of the industrial automation system 130, via the network 120, by performing methods as discussed above and below with reference to FIG. 4.

Figure 2:
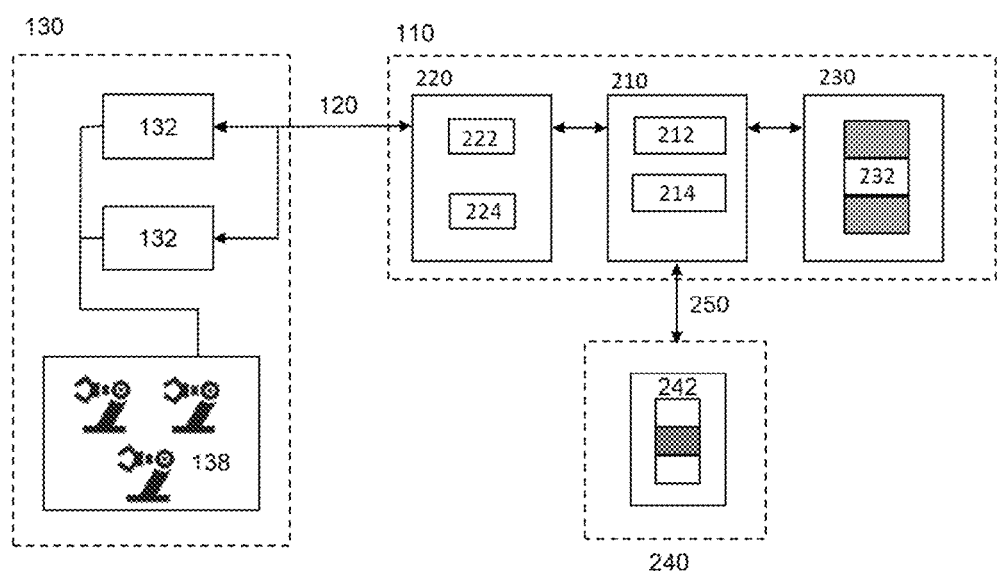
FIG. 2: a functional-block diagram of an implementation of a cloud computing system according to some aspects of the present disclosure.

FIG. 2 shows a functional block diagram illustrating further aspects of the system architecture, functions and operation of a cloud computing system 110 according to some aspects of the present disclosure. In particular, FIG. 2 illustrates key aspects of the software architecture of the cloud computing system 110. As discussed above the cloud computing system 110 is configured to generated and operate one or more compile time representations 210 for each controller 132 (e.g., jointly or as separate instances) to be configured via the network 120. As also discussed above, in some implementations, the compile time representations 210 may comprise or use a persistence layer 212 and programming interface layer 214. The persistence layer 212 may be configured for holding controller configurations and control instruction elements of controller programs, wherein the individual control elements are represented as separated control logic objects. Moreover, the individual elements of the persistence layer 212 may be individually configurable based on programming and configuration instructions received via a programming interface 250 via the programming interface layer 214.

For instance, the cloud computing system 110 may be configured for receiving via a programming interface 250 programming and configuration instructions for modifying the controller programs and/or the controller configurations maintained by persistence layer 212 as discussed above as well as for generating the modified controller program and/or modified controller configuration based on the received instructions.

For instance, the programming and configuration instructions 242 may be received via an API 250 form a second cloud computing system 240 such as a PLM, manufacturing execution, CRM, SCM or ERP system.

The cloud computing system 110 may be further configured to host an integrated development environment (IDE) service 230 that may provide controller program instructions 232 (e.g., in the form of blocks of control logic elements) and/or controller configurations as discussed above.

As discussed above, the modified controller program can then be provided to a compiler service 220 (operably connected to or integrated with the PLC Twin service 210) hosted by the cloud computing system 110, generating a run time executable which is then provided, via a network 120, to one or more hardware-based PLCs 132 or virtual PLC services 132, hosted by an edge-computing system (see FIG. 1 and FIG. 3), controlling a subsystem 138 (e.g. sensors and/or actuators) of the industrial automation system 130. Such a compiler service 220 may be implemented as a cloud computing service external to the PLC Twin service 210 or be integrated into it. The compiler service 220 may also comprise several different compiler modules 222, 224 for compiling different types of (e.g., vendor-specific) controller program types.

For instance, the compiler service 220 and/or the PLC Twin service 210 may be implemented in/via a configurable virtualization environment such as a container or micro service specifying—inter alia—security access policies and/or system resource utilization parameters as well as comprising software libraries required for isolated execution of the respective service by different types of (virtual) cloud computing equipment.

As discussed above, the cloud computing system illustrated in FIG. 2 is thus configured to carry out the various methods for configuring industrial controllers discussed above and with reference to FIG. 4 below.

Figure 3:
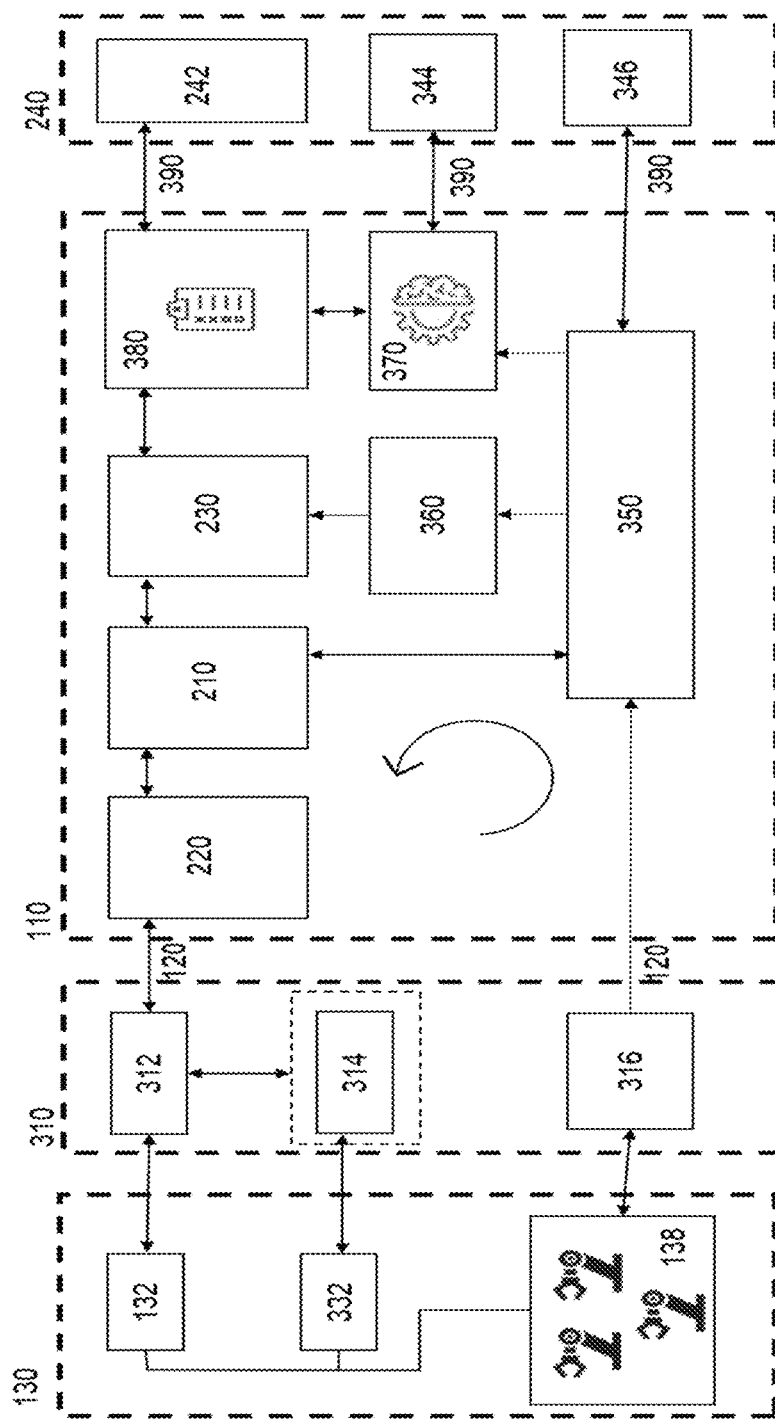
FIG. 3: a functional-block diagram of an implementation of a cloud computing system adapted for enabling closed loop (re-)configuration of industrial automation systems according to some aspects of the present disclosure.

FIG. 3 shows a functional block diagram illustrating further aspects of the system architecture, functions and operation of a cloud computing system 110 according to further aspects of the present disclosure. In particular, FIG. 3 illustrates key aspects of the software architecture of a cloud computing system 110 that is configured for enabling fully closed-loop controller (re-)configuration as discussed in more detail above.

In addition to the elements, features and functions discussed with reference to FIG. 2, FIG. 3 also illustrates industrial automation systems 130 involving an edge computing system 310 operably connected, e.g., via a network 120, to the cloud computing system 110. The edge computing system 310 may comprise a controller management service/module 312 and may be configured for executing edge computing software for implementing/hosting virtual controllers 314 (e.g., virtual PLCs).

In such configurations, the controller configuration obtained and used for generating the corresponding compile time representation 210 may also specify a virtualization environment for executing the edge computing software implementing the virtual controller 314 as well as a network configuration of a physical I/O devices 332 connected to a subsystem 138 of the industrial automation system 130 to be controlled by the virtual controller 314.

The cloud computing system 110, e.g., via the controller management service/module 312, may be configured for instantiating the virtual controller 314, via the network 120, on a host machine of the edge computing system 310 managed by a real-time hypervisor to enable deterministic real-time control of the corresponding subsystem 138.

The edge computing system 31o may also comprise/host a sensor management service/module 316 configured to receive, to pre-process and forward sensor data to the cloud-computing system 110, via the network 120, as discussed above.

In particular, the cloud computing system 110 may be configured for receiving, via the network 120, sensor data associated with a subsystem 138 of the industrial automation system 130, controlled by controller 132, 314 and for generating programming and configuration instructions (e.g., via an API to the IDE 230) for modifying the controller program and/or the controller configuration, based on analyzing the received sensor data.

The received sensor data may for example be stored in a data storage module 350 of the cloud computing system 110 that may also be used to support or enable operation of the persistence layer used by the compile time representations 210.

The cloud computing system may also host a sensor data processing and displaying service 360 that may implement certain sensor data analysis steps as discussed above.

For instance, such a sensor data processing and displaying service 360 may be configured for deriving, based on the received sensor data, a quality metric associated with operation of the subsystem 138 controlled by the controller 132, 314 and for comparing the quality metric with an operation requirement for the industrial automation system 130 as well as for generating, (e.g., directly or via an API to the IDE service 230) programming and configuration instructions, based on the comparison of the quality metric with the operation requirement as discussed in more detail above.

The cloud computing system 110 may further comprise/ host an artificial intelligence (AI) module/service 370 that may be operably connected (e.g., via APIs 390) to the data storage module 350 and/or to further cloud-based software systems 242, 344, 346 as discussed above. Moreover, the AI service 370 may be interfaced with an experiment engine 380 hosted by the cloud computing system 110, which in turn may be interfaced with the PLC Twin service 210 (e.g., directly or via an API to the IDE service 230).

In this manner, the cloud computing system 110 may be configured for AI-based auto-optimization of the industrial automation system 130 as discussed in more detail above. Specifically, the cloud computing system 110 may be configured for carrying out a method for optimizing performance of an industrial automation system as disclosed herein and with reference to FIG. 5.

Figure 4:
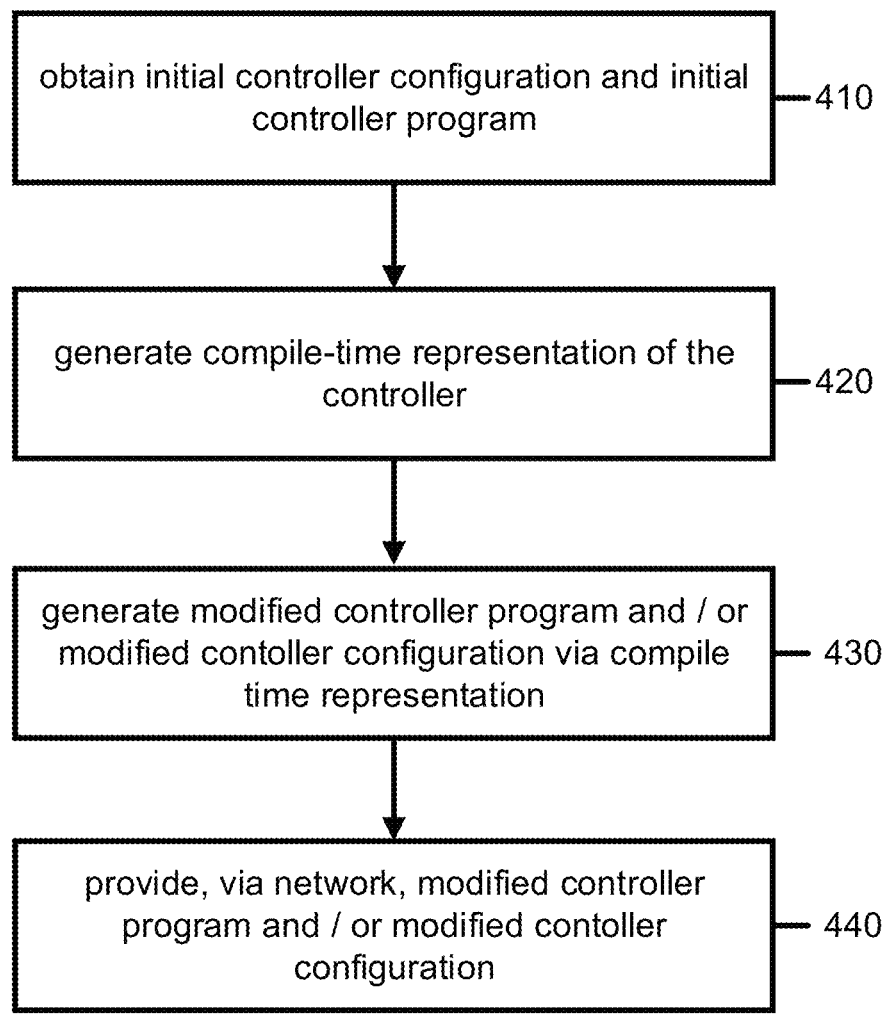
FIG. 4: a process diagram illustrating a method for configuring a controller of an industrial automation system according to some aspects of the present disclosure.

FIG. 4 illustrates an example method for configuring a controller of an industrial automation system via a network (see FIGS. 1 to 3). The process starts at step 410, where a cloud computing system obtains a controller configuration and a controller program. At step 420, the cloud computing system, generates, based on the obtained controller configuration and the obtained controller program, a compile time representation of the controller allowing modification of the controller program and the controller configuration (e.g., via programming interfaces or a GUI-based IDE). Next, at step 430 a modified controller program and/or a modified controller configuration is generated, using the compile time representation of the controller wherein the controller program defines run time operation of the controller controlling a subsystem of the industrial automation system (as discussed in more detail above and with reference to FIGS. 1 to 3).

Then, at step 440, the cloud computing system provides, via the network, the modified controller program and/or the modified controller configuration to the controller of the industrial automation system. Further implementations of such a method are discussed in detail above.

Figure 5:
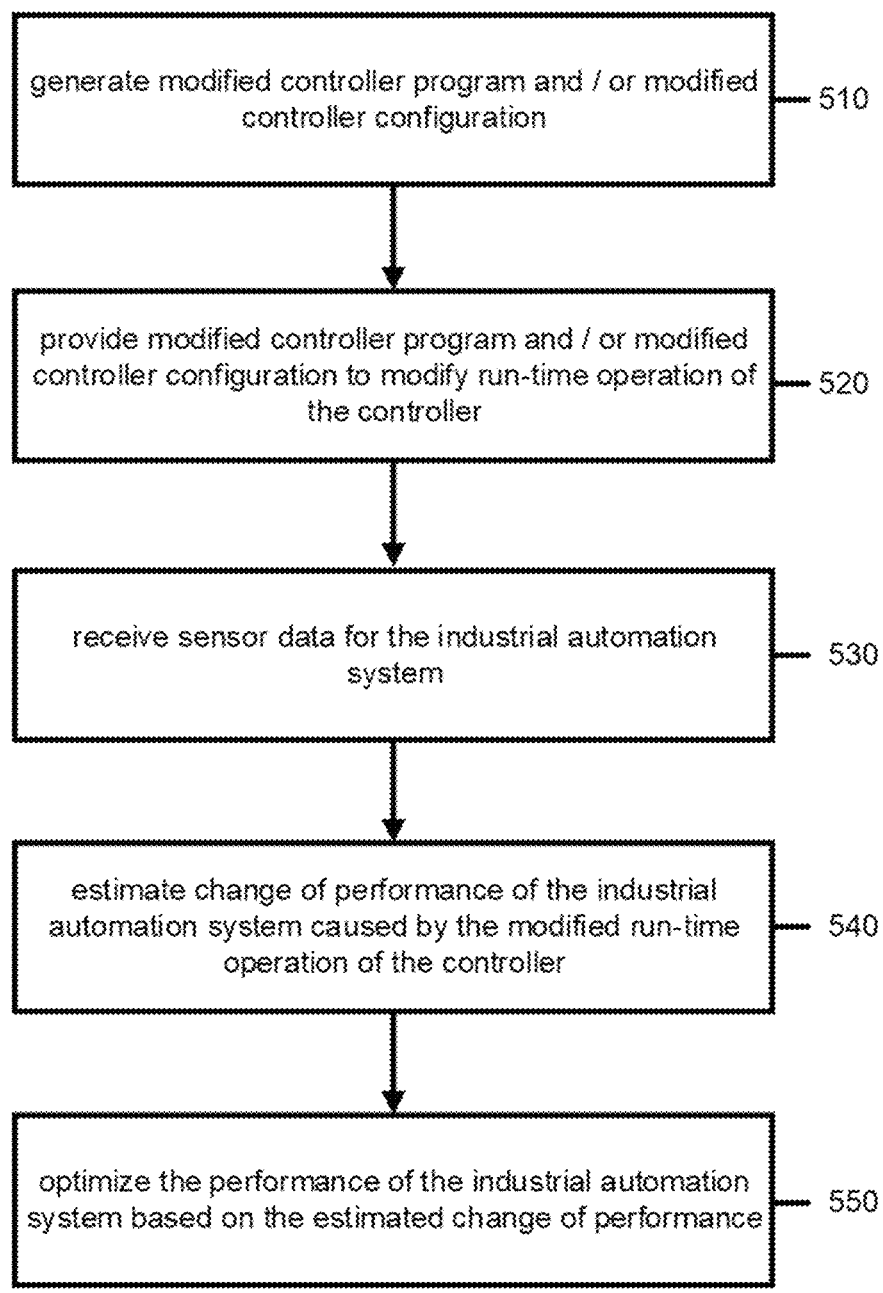
FIG. 5: a process diagram illustrating a method for optimizing performance of an industrial automation system according to some aspects of the present disclosure.

In accordance with another aspect of the present disclosure, FIG. 5 illustrates a method for optimizing performance of an industrial automation system, comprising the following steps:

Generating 510, by a cloud computing system (for implementation details see FIGS. 1 to 3), a modified controller program and/or a modified controller configuration for a controller controlling a subsystem of the industrial automation system, wherein the controller program defines runtime operation of the controller and, providing 520, by the cloud computing system via a network, the modified controller program and/or the modified controller configuration to the controller to modify the run time operation of the controller.

The illustrated method further comprises receiving 530, at the cloud computing system via the network, sensor data for the industrial automation system and estimating 540, by the cloud computing system and based on the received sensor data, a change of the performance of the industrial automation system caused by the modified run time operation of the controller and optimizing 540, by the cloud computing system, the performance of the industrial automation system based on the estimated change of performance.

Further implementations of such a method are discussed in more detail above.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for configuring a controller of an industrial automation system via a network, the method comprising:
obtaining, by a cloud computing system, a controller configuration and a controller program;
generating, by the cloud computing system, based on the obtained controller configuration and the obtained controller program, a compile time representation of the controller allowing modification of the controller program and the controller configuration at compile time comprising a time at or prior to generation of run time machine code for the controller from a corresponding source code, and a time during with the source code is generated by extracting the source code from a configuration file or by writing the source code via programming language or via a cloud-based source code development environment; and
generating, by the cloud computing system, a modified controller program and a modified controller configuration, using the compile time representation of the controller, wherein the controller program defines runtime operation of the controller controlling a subsystem of the industrial automation system; and
providing, by the cloud computing system via the network, the modified controller program and the modified controller configuration to the controller of the industrial automation system,
wherein the obtained controller configuration further comprises one or more of: controller type and capability information, network configuration of the controller, interface information for electromechanical drives, and interface configuration for I/O devices connected to the controller via back panel integration of Industrial Field Bus Systems, wherein the compile time representation of the controller comprises a persistence layer holding controller configurations and control instruction elements of controller programs, wherein the individual control elements are represented as separated control logic objects, and wherein individual elements of the persistence layer are individually configurable based on programming and configuration instructions received via a programming interface.

2. The method of claim 1, wherein parts of the controller configuration and/or the controller program are obtained, at the cloud computing system, from the controller, from a controller configuration file and/or from a software library or source code repository residing within or outside the cloud computing system.

3. The method of claim 1, wherein the controller program is obtained, at the cloud computing system, from an integrated development environment service hosted by the cloud computing system.

4. The method of claim 1, further comprising:
receiving, at the cloud computing system, via the programming interface, programming and configuration instructions for modifying the obtained controller program and/or the obtained controller configuration; and
generating the modified controller program and/or modified controller configuration based on the received instructions.

5. The method of claim 4, wherein the programming interface is an application programming interface (API) and wherein the programming and configuration instructions are received via the API from a second cloud computing system; and wherein the programming and configuration instructions are configured to modify the controller program and/or the controller configuration based on product lifecycle management (PLM) requirements, manufacturing execution requirements, customer relationship management (CRM) requirements, supply chain management (SCM) requirements and/or enterprise resource planning (ERP) requirements.

6. The method of claim 4, further comprising:
receiving, at the cloud computing system, via the network, sensor data associated with a subsystem of the industrial automation system, controlled by the controller; and
generating, by the cloud computing system, the programming and configuration instructions for modifying the controller program and/or the controller configuration, based on analyzing the received sensor data.

7. The method of claim 6, further comprising:
deriving, by the cloud computing system and based on the received sensor data, a quality metric associated with operation of the subsystem controlled by the controller;
comparing, by the cloud computing system, the quality metric with an operation requirement for the industrial automation system; and
generating, by the cloud computing system, the programming and configuration instructions, based on the comparison of the quality metric with the operation requirement.

8. The method of claim 7, further comprising:
classifying, by the cloud computing system, product quality based on the received sensor data and comparing a frequency or percentage of product defects with an operation requirement; and/or
determining a likely cause and/or a suitable controller program modification for matching the operation requirement based on the received sensor data.

9. The method of claim 1,
wherein the controller is a virtual controller, implemented by edge computing software executed by an edge computing system operably connected to the cloud computing system and the industrial automation system; and
wherein the obtained controller configuration specifies a virtualization environment for executing the edge computing software implementing the virtual controller and comprises a network configuration of a physical I/O device connected to a subsystem of the industrial automation system to be controlled by the virtual controller.

10. The method of claim 9, further comprising,
instantiating the virtual controller, by the cloud computing system via the network, on a host machine of the edge computing system managed by a real-time hypervisor.

11. The method of claim 9, further comprising:
receiving, at the cloud computing system, monitoring data from the edge computing system characterizing performance of the virtual controller.

12. The method of claim 1, further comprising: generating the obtained controller program and/or the programming and configuration instructions using an integrated development environment of the cloud computing system.

13. A computer program stored in one or more non-transitory computer-readable media comprising instructions for carrying out the method of claim 1 when being executed by a cloud computing system.

14. A cloud computing system for configuring one or more controllers of an industrial automation system, the cloud computing system comprising:
one or more cloud compute nodes, each including and providing processing, memory and networking resources for execution of cloud computing software;
wherein the cloud compute nodes are configured to receive and to transmit, via a network, data from and to the controllers of the industrial automation systems and, optionally, from one or more sensors monitoring the industrial automation system;
wherein the one or more cloud compute nodes are configured to execute cloud computing software to configure the controllers, via the network, by:
obtaining, by the cloud computing system, a controller configuration and a controller program;
generating, by the cloud computing system, based on the obtained controller configuration and the obtained controller program, a compile time representation of the controller allowing modification of the controller program and the controller configuration at compile time comprising a time at or prior to generation of run time machine code for the controller from a corresponding source code, and a time during with the source code is generated by extracting the source code from a configuration file or by writing the source code via programming language or via a cloud-based source code development environment; and
generating, by the cloud computing system, a modified controller program and a modified controller configuration, using the compile time representation of the controller, wherein the controller program defines runtime operation of the controller controlling a subsystem of the industrial automation system; and providing, by the cloud computing system via the network, the modified controller program and the modified controller configuration to the controller of the industrial automation system, wherein the obtained controller configuration further comprises one or more of: controller type and capability information, network configuration of the controller, interface information for electromechanical drives, and interface configuration for I/O devices connected to the controller via back panel integration of Industrial Field Bus Systems, wherein the compile time representation of the controller comprises a persistence layer holding controller configurations and control instruction elements of controller programs, wherein the individual control elements are represented as separated control logic objects, and wherein individual elements of the persistence layer are individually configurable based on programming and configuration instructions received via a programming interface.

15. A distributed industrial automation control system comprising:

the cloud computing system according to claim 14;

one or more controllers of an industrial automation system connected to the cloud computing system via a network; and a further cloud computing system communicating with the cloud computing system via a programming interface.

* * * * *